United States Patent [19]
Auble et al.

[11] Patent Number: 4,787,513
[45] Date of Patent: Nov. 29, 1988

[54] LIGHT-TIGHT CASSETTE

[75] Inventors: Ronald E. Auble, Spencerport, N.Y.; Ralph E. Grady, Loveland, Colo.

[73] Assignee: Eastman Kodak Company, Rochester, N.Y.

[21] Appl. No.: 166,299

[22] Filed: Mar. 10, 1988

[51] Int. Cl.$^4$ .................... B65D 85/67; B65H 19/02; G03B 17/26

[52] U.S. Cl. .................... 206/407; 206/409; 242/71.7; 354/275; 355/72

[58] Field of Search ........ 206/389, 395, 397, 407–409; 242/55.53, 71.1–71.7; 354/275; 355/72

[56] References Cited

U.S. PATENT DOCUMENTS

| | | | |
|---|---|---|---|
| 4,034,929 | 7/1977 | Ebner, Jr. | 242/71.1 |
| 4,068,247 | 1/1978 | Bouwen et al. | 354/275 |
| 4,239,164 | 12/1980 | Barnsbee et al. | 242/55.53 |
| 4,291,802 | 9/1981 | Buelens | 242/71.7 |
| 4,398,814 | 8/1983 | Muylle et al. | 242/71.1 |
| 4,597,658 | 7/1986 | Buelens et al. | 206/409 |
| 4,671,409 | 6/1987 | Espy | 242/55.53 |

OTHER PUBLICATIONS

"Web Dispensing Cassette", *Research Disclosure*, 10-1976, pp. 26, 27.

*Primary Examiner*—Jimmy G. Foster
*Attorney, Agent, or Firm*—William C. Dixon

[57] ABSTRACT

A light-tight cassette is disclosed for handling and dispensing a roll of photosensitive web material. The cassette comprises a plurality of side walls erected or formed from a single sheet of material in which the ends thereof are folded back upon themselves in a triangular configuration to define a pair of faceted tubes. When the cassette is assembled, a narrow web exit passageway is defined by two opposed facets of the respective tubes. The side walls comprise first and second side walls of convexly outwardly curved cross sections adjacent the tubes. A pair of end closure caps serve to close the side edges of the side walls and to support the roll and core for unwinding rotation. Each end cap has a plurality of beveled corners merging with straight channels for receiving complementary side edges of the side walls so that when the curved side edges of the first and second side walls are inserted into complementary corner relief areas and straight channels, forces are generated within the curved side walls causing the opposed facets to define the exit passageway with a substantially constant passageway width from one of the side edges of the side walls to the opposite side edges of the side walls. The tubes of the exit passageway subject the exiting web material to a substantially constant minimal pressure across the width thereof, and maximize the cassette beam strength.

7 Claims, 3 Drawing Sheets

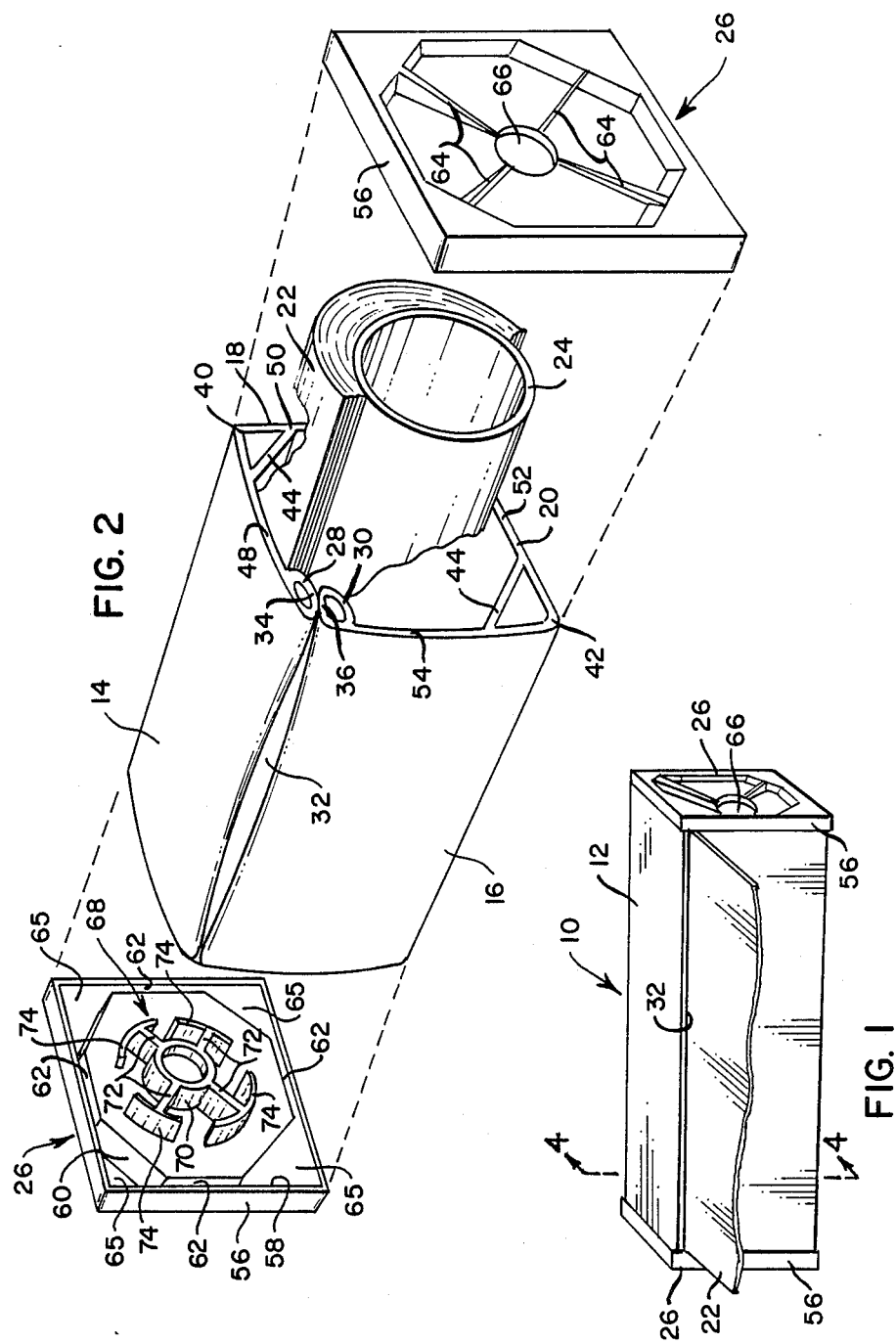

LIGHT-TIGHT CASSETTE

BACKGROUND OF THE INVENTION

1. Field of the Invention

The present invention relates generally to cassettes, and more particularly to a light-tight cassette for handling and dispensing a roll of photosensitive web material, such as phototypesetting paper and film.

2. Description of the Prior Art

Cassettes for holding and dispensing a roll of light-sensitive photosensitive web material, such as phototypesetting paper and film, are well known in the art. Such cassettes are in the form of a rectanguloid box-like casing comprising four side walls formed from a single sheet of material in which the ends thereof define a pair of faceted tubes. When the cassette is erected, a narrow web exit passageway is defined by two opposed facets of the respective tubes. A pair of end closure caps close the side edges of the side walls, and further have central hub portions for rotatably supporting the roll within the cassette. At least one of the detachable end caps of such known cassettes has spaced inner and outer peripheral wall portions defining a peripheral channel for receiving the side edges of the side walls.

A problem with such known cassettes is that the exit passageway thereof does not have a substantially constant gap width extending from one of the side edges of the side walls of the cassette to the opposite side edges. This is particularly a problem with cassettes designed to handle and dispense web materials of a width in excess of 12 inches. In such cassettes, the gap width in the portion of the passageway intermediate the side edges of the side walls is enlarged, resulting in possible light leakage in that portion of the passageway, and in unequal pressure being exerted on the exiting web material from one side edge of the web to the opposite side edge thereof.

Accordingly, an object of the present invention is to provide a light-tight cassette in which this problem of uneven gap width and unequal pressure disbursement on the web material from one side edge thereof to the opposite side edge is overcome, thereby resulting in a cassette of equal pressure disbursement on the exiting web material and improved light integrity.

SUMMARY OF THE INVENTION

The present invention provides a light-tight cassette for housing and dispensing a roll of web material comprising:

a plurality of side walls comprising first and second side walls of convexly outwardly curved cross sections formed from a single sheet of material for partially enclosing a roll of web material, the side walls further having side edges;

first and second faceted tubes formed at opposite ends of the sheet material corresponding to free edges of the first and second curved side walls, respectively, the first and second tubes having first and second opposed facets, respectively, defining a narrow web exit passageway; and a pair of end caps for supporting ends of the roll and for closing the side edges of the side walls, each end cap having a plurality of straight channels for receiving complementary side edges of the side walls, whereby when the curved side edges of the first and second side walls are inserted into the complementary straight channels, forces are developed within the first and second curved side walls causing the first and second facets to define the exit passageway with a substantially constant width from one of the side edges of the first and second side walls to the opposite side edges of the first and second side walls.

In a more specific aspect of the invention, the first curved side wall has a curvature of a substantially 12-inch radius, and the second curved side wall has a curvature of a substantially 24-inch radius.

In still further aspects of the invention, the side walls comprise third and fourth side walls connecting the first side wall to the second side wall. The first side wall is connected to the third side wall by a rigid corner of substantially 90°, and the second side wall is connected to the fourth side wall by a rigid corner of substantially 90°. Gussetts are provided spanning, or extending across, the corners from the first side wall to the third side wall and from the second side wall to the fourth side wall to rigidify, or increase the beam strength of, the side walls from one of the side edges thereof to their opposite side edges. A living hinge connects the third side wall to the fourth side wall so that the side walls can be flexed open and shut for convenient storage and assembly. The first and second faceted tubes are unsupported at their ends so that they can mate more freely and thereby enhance light-lock integrity.

BRIEF DESCRIPTION OF THE DRAWINGS

In the detailed description of the invention presented below, reference is made to the accompanying drawings, in which:

FIG. 1 is a perspective view of a light-tight cassette in which a preferred embodiment of the invention is embodied;

FIG. 2 is an enlarged exploded perspective view of the light-tight cassette of FIG. 1;

DETAILED DESCRIPTION OF THE PREFERRED EMBODIMENT

Figure 3:
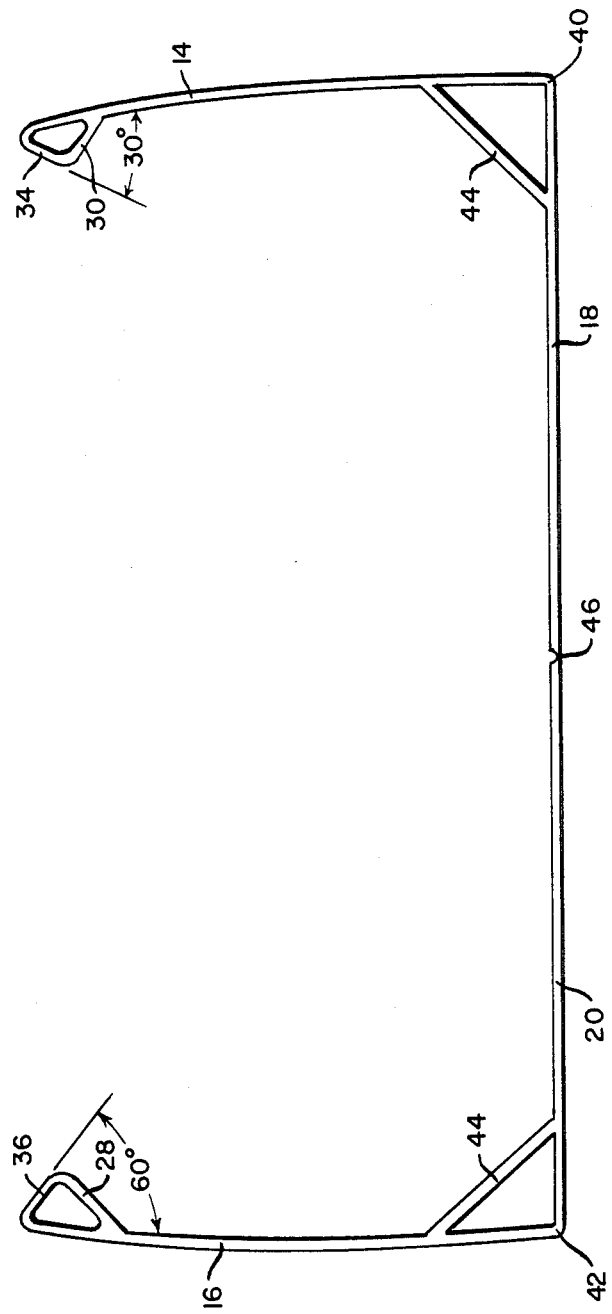
FIG. 3 is an enlarged end elevational view of the sheet member forming the side walls of FIG. 2 shown in an open position.

Because light-tight cassettes for handling and dispensing a roll of photosensitive photographic material are well known, the present description will be directed in particular to elements forming part of, or cooperating more directly with, apparatus in accordance with the present invention. It is to be understood that elements not specifically shown or described may take various forms well known to those skilled in the art.

Referring to FIGS. 1 and 2, a preferred embodiment of a light-tight cassette 10 of this invention is in the form of a rectanguloid box comprising a shell 12 formed from a single sheet of material having first, second, third, and fourth side walls 14, 16, 18, and 20 respectively. The shell 12 houses a roll of web material 22, such as phototypesetting film or paper, coated with a light-sensitive emulsion. The web material is wound upon a cylindrical tubular web winding core 24 having open ends, only one of which is shown in FIG. 2. A pair of identical end caps 26 are provided to close the cassette ends and to support the web roll and core 24 for unwinding rotation.

The ends of the sheet of material forming the side walls are folded back upon themselves in triangular configurations to form a pair of faceted tubes 28, 30. When cassette 10 is assembled, a narrow web exit passageway 32 is defined by first and second opposed facets 34, 36 carried by the respective tubes 28, 30. The tubes 28, 30 lend structural stability, or beam strength, to the first and second side walls 14, 16 respectively, so as to resist flexing or other deformation of the side walls and passageway formed thereby.

Figure 4:
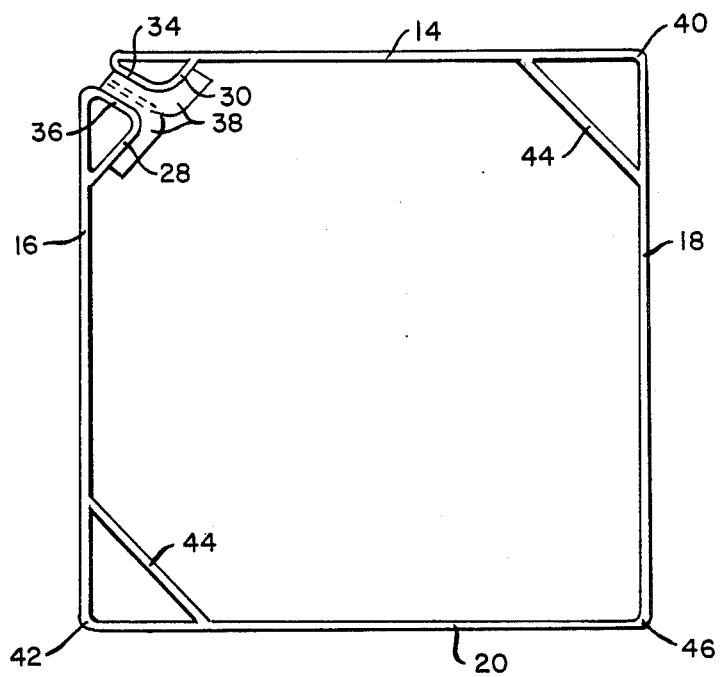
FIG. 4 is a section view taken substantially along line 4—4 of FIG. 1 with the web roll omitted for purposes of clarity.
Figure 5:
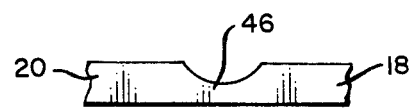
FIG. 5 is an enlarged segmental view of the living hinge portion of the side walls of FIG. 3.

As best shown in FIG. 3, the first facet 34 defines an angle relative to first side wall 14 of substantially 30° to minimize its influence on the force required to extract the web material 22 from the cassette. The second facet 36 forms an angle of substantially 60° relative to second side wall 16 to maximize the structural stability, or beam strength, of tubes 28, 30 and sidewalls 14, 16 respectively. The first and second facets 34, 36 respectively are provided with resilient light-lock strips of plush material 38, for example, which when cassette 10 is in an assembled condition, as seen in FIGS. 1 and 4, cooperate to form an effective light-lock to prevent light from entering the cassette through passageway 32.

The cassette shell 12, as best seen in FIGS. 2-5, is provided with a pair of rigid corners 40, 42 of substantially 90° angle joining first curved side wall 14 to third side wall 18, and second curved side wall 16 to fourth side wall 20. A pair of gussettes 44 span corners 40, 42 and connect the first and third side walls 14, 18 together and the second and fourth side walls 16, 20 together to form a rigid support for the first and second curved side walls 14, 16 and to increase their beam strength. The third and fourth side walls 18, 20 respectively are joined by a living hinge 46 which allows the side walls 14, 16, 18, 20 to be moved from the FIG. 3 position to the FIG. 4 position, and allows the cassette shell 12 to be flexed into a "W" shape, not shown, for stacked storing, thereby minimizing storage space and increasing transporting convenience.

The pair of end caps 26 serve both to close side edges 48, 50, 52, 54 of the cassette shell and to support the roll of web material 22 and core 24 for unwinding rotation. Each end cap 26 has an outer peripheral wall 56 having a continuous inner peripheral surface 58 opposed by a continuous slanted wall member 60. The inner surface 58 and wall member 60 cooperate to define straight channels 62 sized to receive, in closely fitted relation, side edges 48, 50, 52 and 54 of side walls 14, 18, 20, and 16, respectively, when cassette 10 is assembled, and to define triangularly shaped corner relief areas 65 to freely receive shell corners 40, 42 and the ends of tubes 28, 30. The tube ends are unsupported, allowing facets 34, 36 to mate more freely and thereby enhance light-lock integrity.

In order to provide structural rigidity to end caps 26 and to thereby support adequately the roll of web material 22, a series of raised ribs 64 extend generally radially outwardly from an outer hub end 66 and effectively interconnect the hub end with slanted wall member 60. Each end cap 26 has a central, generally cylindrical and axially extending hub member 68 which is sized and positioned to receive an open end of core 24. The hub member 68 essentially comprises a laterally extending cylindrical tube member 70 having radially outwardly extending fins 72 having arcuate segments 74 at the ends thereof cooperating to form hub member 68.

The end caps 26 and side walls 14, 16, 18, 20 preferably may be formed from a 20% talc-filled Tenite (trademark) polypropylene resin material. The addition of the talc to the resin material serves as a stiffening medium. Opacity is provided by the addition of carbon black to the clear resin base. The end caps 26 preferably may be formed from a flat sheet of the thermoplastic material by known vacuum-forming or injection-molding techniques. The side walls preferably are formed by extruding the thermoplastic material through a suitably designed extrusion die.

The cassette 10 of this invention is compatible with mechanical cassette assembly and loading operations. One possible method of assembly may comprise the steps of extruding thermoplastic material in a web form, severing the web into sheets of material forming the cassette sidewalls 14, 16, 18, 20 having tubes 28, 30 at the ends thereof, applying strips of light-lock material 38 to opposed facets 34, 36 of the side wall tubes, bending the cassette side walls into the form of shell 12 shown in FIG. 4, placing an end cap 26 on one end of the shell, inserting a prewound roll of photosensitive web material 22 into the opposite, open end of the shell with the free web end threaded through exit passageway 32, and applying the second end cap 26 to the shell to complete the cassette assembly. The end caps 26 may be secured to the side walls by, for example, ultrasonic sealing, adhesive, or mechanical attachment, such as by stapling.

The invention has been described in detail with particular reference to a preferred embodiment thereof, but it will be understood that variations and modifications can be effected within the spirit and scope of the invention.

What is claimed is:

1. A light-tight cassette for housing and dispensing a roll of web material comprising:
   a plurality of side walls comprising first and second side walls of convexly outwardly curved cross sections formed from a single sheet of material for partially enclosing a roll of web material, the side walls further having side edges;
   first and second faceted tubes formed at opposite ends of the sheet material corresponding to free edges of the first and second curved side walls, respectively, the first and second tubes having first and second opposed facets, respectively, defining a narrow web exit passageway; and
   a pair of end caps for supporting ends of the roll and for closing the side edges of the side walls, each end cap having a plurality of straight channels for receiving complementary side edges of the side walls, whereby when the curved side edges of the first and second side walls are inserted into the complementary straight channels, forces are developed within the first and second curved side walls causing the first and second facets to define the exit passageway with a substantially constant width from one of the side edges of the first and second side walls to the opposite side edges of the first and second side walls.

2. A light-tight cassette according to claim 1 wherein the opposed facets are provided with light-lock strips of plush material.

3. A light-tight cassette according to claim 2 wherein the first facet defines an angle of substantially 30° with the first side wall, and wherein the second facet defines an angle of substantially 60° with the second side wall.

4. A light-tight cassette according to claim 3 wherein the first side wall has a curvature of a substantially 12-inch radius, and wherein the second side wall has a curvature of a substantially 24-inch radius.

5. A light-tight cassette according to claim 4 wherein the side walls further comprise third and fourth side walls connecting the first side wall to the second side wall, and wherein a living hinge connects the third side wall to the fourth side wall.

6. A light-tight cassette according to claim 5 wherein the first side wall is connected to the third side wall by a rigid corner of substantially 90°, wherein the second side wall is connected to the fourth side wall by a rigid corner of substantially 90°, and wherein gussettes are provided extending across the corners from the first side wall to the third side wall and from the second side wall to the fourth side wall to increase the beam strength of the first and second side walls from one of the side edges thereof to their opposite side edges.

7. A light-tight cassette according to claim 6 wherein each end cap has a corner relief area for receiving side edges of the first and second tubes for allowing the first and second tubes to seek a natural light-tight mating position.

* * * * *